United States Patent
Ek et al.

(10) Patent No.: US 8,169,461 B2
(45) Date of Patent: May 1, 2012

(54) METHOD AND SYSTEM FOR A QUICK START CAMERA APPLICATION IN A CAMERA

(75) Inventors: Carl M. Ek, Dalby (SE); Par M. Ragnarsson, Lund (SE)

(73) Assignee: Sony Ericsson Mobile Communications AB, Lund (SE)

(*) Notice: Subject to any disclaimer, the term of this patent is extended or adjusted under 35 U.S.C. 154(b) by 1250 days.

(21) Appl. No.: 11/863,395

(22) Filed: Sep. 28, 2007

(65) Prior Publication Data

US 2009/0086011 A1   Apr. 2, 2009

(51) Int. Cl.
*H04N 7/14* (2006.01)
(52) U.S. Cl. ............ 348/14.02; 348/14.01; 348/211.11; 455/556.1; 455/566
(58) Field of Classification Search .... 348/14.01–14.16, 348/211.11–211.13; 455/556.1, 566, 575.1
See application file for complete search history.

(56) References Cited

U.S. PATENT DOCUMENTS

| | | | |
|---|---|---|---|
| 5,926,218 A | 7/1999 | Smith | |
| 2003/0036365 A1* | 2/2003 | Kuroda | 455/90 |
| 2007/0273752 A1* | 11/2007 | Chambers et al. | 348/14.02 |
| 2008/0012952 A1* | 1/2008 | Lee | 348/211.11 |

FOREIGN PATENT DOCUMENTS

| | | |
|---|---|---|
| JP | 2003-32744 | 1/2003 |
| JP | 2006-93859 | 4/2006 |

OTHER PUBLICATIONS

International Preliminary Report on Patentability for International Application No. PCT/IB08/000728 dated Apr. 8, 2010.
International Search Report and Written Opinion for International Application No. PCT/IB2008/000728 dated Jul. 22, 2008.

* cited by examiner

*Primary Examiner* — Melur Ramakrishnaiah
(74) *Attorney, Agent, or Firm* — Renner, Otto, Boisselle & Sklar, LLP

(57) ABSTRACT

A mobile radio terminal includes a radio circuit for establishing communication with a communication network, a first camera sensor for taking digital photographs and a second camera sensor for acquiring image data information, wherein the second camera sensor stores the acquired image data information in a storage element. A control circuit is coupled to the radio circuit, the first camera sensor, the second camera sensor and the memory and the control circuit is configured to execute logic to: store image data information acquired from the second camera sensor in the memory; detect initiation of a camera application by an associated user; generate a control signal to launch the camera application, wherein at least a portion of the acquired image data information is provided to the camera application as one or more parameters upon launching of the camera application; and acquiring image information from the first camera sensor for taking a photograph.

19 Claims, 3 Drawing Sheets

METHOD AND SYSTEM FOR A QUICK START CAMERA APPLICATION IN A CAMERA

TECHNICAL FIELD OF THE INVENTION

The present invention relates generally to electronic equipment, such as electronic equipment for taking pictures and/or for engaging in voice communications. More particularly, the invention relates to a method and system for decreasing the start-up time associated with a camera application upon initiation by a user for use in a camera and/or camera equipped mobile radio terminal.

DESCRIPTION OF THE RELATED ART

Mobile and/or wireless electronic devices are becoming increasingly popular. For example, electronic equipment (e.g., camera equipped mobile radio terminals, digital cameras, camcorders, etc.) are now in wide-spread use. In addition, the features associated with certain types of portable communication devices have become increasingly diverse. To name a few examples, many electronic devices have cameras, text messaging capability, Internet browsing functionality, electronic mail capability, video playback capability, audio playback capability, image display capability and hands-free headset interfaces.

One drawback with digital cameras and camera equipped mobile radio terminals is the amount of time it takes for the camera application to load and/or to otherwise be available for use after a user initiates the camera application. Often times, the delay is so long (e.g., a few seconds) that the user is unable to take the desired photograph (e.g., because the objects desired to be photographed have moved, change in lighting, change in environment, etc.).

SUMMARY

Based on the foregoing, there is a need in the art for a method and system to decrease the start-up time associated with the camera application upon initiation by a user in a camera and/or camera equipped mobile radio terminal.

According to one aspect of the invention, a mobile radio terminal, comprising a radio circuit for establishing communication with a communication network; a first camera sensor for taking digital photographs; a second camera sensor for acquiring image data information, wherein the second camera sensor stores the acquired image data information in a memory; and a control circuit coupled to the radio circuit, the first camera sensor, the second camera sensor and the memory, wherein the control circuit is configured to execute logic to: store image data information acquired from the second camera sensor in the memory; detect initiation of a camera application by an associated user; generate a control signal to launch the camera application, wherein at least a portion of the acquired image data information is provided to the camera application as one or more parameters upon launching of the camera application; and acquiring image information from the first camera sensor for taking a photograph.

According to another aspect of the invention, the first camera sensor is at least one sensor selected from a group consisting of: a charge-coupled device (CCD) or a complimentary metal-oxide semiconductor (CMOS).

According to another aspect of the invention, the second camera sensor is at least one sensor selected from a group consisting of a charge-coupled device (CCD) or a complimentary metal-oxide semiconductor (CMOS).

According to another aspect of the invention, the first camera sensor has greater resolution than the second camera sensor.

According to another aspect of the invention, the image data information is periodically acquired at a predetermined time interval by the second camera sensor.

According to another aspect of the invention, the image data information includes at least one selected from a group consisting of: color balance, focal distance and/or flash support.

According to another aspect of the invention, the image data information is continuously updated while the mobile radio terminal is in an operative state.

According to another aspect of the invention, updated image data information is stored over image data information previously stored in the memory.

According to another aspect of the invention, the communication network is a mobile telephone communication network.

One aspect of the invention relates to a method for executing a camera application in a mobile radio terminal, the method comprising: providing a mobile radio terminal having a first camera sensor for taking digital photographs and a second camera sensor for acquiring image data information while the mobile radio terminal is in an operative state; storing image data information acquired from the second camera sensor in the memory; detecting initiation of a camera application by an associated user; generating a control signal to launch the camera application, wherein at least a portion of the acquired image data information is provided to the camera application as one or more parameters upon launching of the camera application; and acquiring image information from the first camera sensor for taking a photograph.

According to another aspect of the invention, wherein the control circuit detects an associated user depressing a user input device coupled to the control circuit prior to generation of the control signal.

According to another aspect of the invention, the first camera sensor is at least one sensor selected from a group consisting of: a charge-coupled device (CCD) or a complimentary metal-oxide semiconductor (CMOS).

According to another aspect of the invention, the second camera sensor is at least one sensor selected from a group consisting of a charge-coupled device (CCD) or a complimentary metal-oxide semiconductor (CMOS).

According to another aspect of the invention, the image data information is periodically updated at a predetermined time interval.

According to another aspect of the invention, updated image data information is stored over image data information previously stored in the memory.

One aspect of the invention relates to an electronic equipment comprising: a first camera sensor for taking digital photographs; a second camera sensor for acquiring image data information while the electronic equipment is in an operative state; a memory coupled to the second camera sensor, wherein the memory stores the acquired image data information; and a control circuit configured to execute a logic to: periodically acquire image data information from the second camera sensor; store the acquired image data information in the memory; detecting initiation of a camera application by a user, wherein the camera application includes one or more image parameters; and setting at least one of the one or more image parameters associated with the camera application to the acquired image data information.

According to another aspect of the invention further including setting at least one of the one or image parameters associated with the camera application to a value acquired by the first camera sensor.

According to another aspect of the invention further including a radio circuit coupled to the control circuit for communication with a mobile communications network.

According to another aspect of the invention, the electronic equipment is a mobile telephone.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

DETAILED DESCRIPTION OF EMBODIMENTS

Figure 1A:
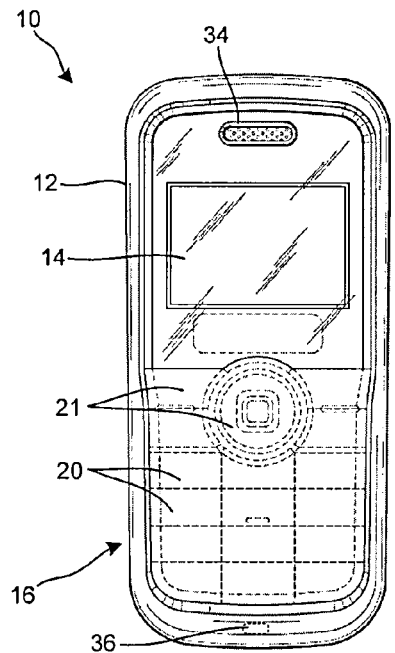
FIGS. 1A and 1B are schematic front view and rear view, respectively, of a mobile telephone as exemplary electronic equipment in accordance with an embodiment of the present invention.

The present invention will now be described with reference to the drawings, wherein like reference numerals are used to refer to like elements throughout. It will be understood that the figures are not necessarily to scale.

The term "electronic equipment" includes portable radio communication equipment, digital cameras, camcorders and the like. The term "portable radio communication equipment," which herein after is referred to as a "mobile radio terminal," includes all equipment such as mobile telephones, pagers, communicators, electronic organizers, personal digital assistants (PDAs), smartphones, portable communication apparatus or the like.

In the present application, the invention is described primarily in the context of a mobile telephone. However, it will be appreciated that the invention is not intended to be limited to a mobile telephone and can be any type of appropriate electronic equipment. Also, embodiments of the invention are described primarily in the context of acquiring image information for decreasing the start-up time associated with execution of executable code in the form of a camera application after the application is initiated by a user. However, it will be appreciated that the invention is not intended to be limited to decreasing the start-up time associated with initiation of the camera application only. For instance, aspects of the invention may relate to changing of photographic modes and/or settings due to environment conditions, changing of photographic settings, etc.

Figure 1B:
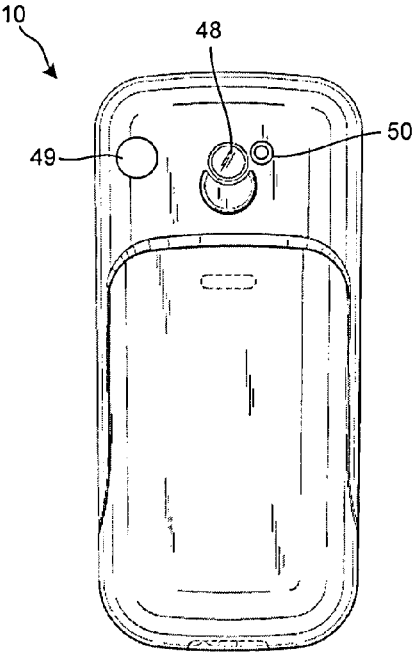

Referring initially to FIGS. 1A and 1B, an electronic equipment 10 is shown in accordance with the present invention. The electronic equipment includes a camera application including a first camera sensor for taking photographs and a second camera sensor that is configured to acquire image data information when the electronic equipment is in an operative state (e.g., in an "on" state). The acquired image data information is stored in memory and made available to the camera application upon initiation of the camera application by an associated user. In this manner, the amount of time between the user initiating the camera application and the time that the camera application is ready to take a picture is reduced. It will be appreciated that the camera application may be embodied in hardware, in software and/or in firmware and in any combination of hardware, software and/or firmware. In one embodiment, the camera application is executable code that may be resident in and executed by the electronic equipment 10.

The electronic equipment in the illustrated embodiments is a mobile telephone and will be referred to as the mobile telephone 10. The mobile telephone 10 is shown as having a "brick" or "block" form factor housing 12, but it will be appreciated that other type housings, such as a clamshell housing or a slide-type housing, may be utilized.

The mobile telephone 10 includes a display 14 and keypad 16. The display 14 displays information to a user such as operating state, time, telephone numbers, contact information, various navigational menus, etc., which enable the user to utilize the various features of the mobile telephone 10. The display 14 may also be used to visually display content received by the mobile telephone 10 and/or retrieved from a memory 18 (FIG. 2) of the mobile telephone 10. In addition, an image may be displayed on the display 14, such as a photograph taken by a camera of the mobile telephone 10 or a photo preview image when the display 14 functions as an electronic viewfinder for the camera. The display 14 may also be used as a camera setting menu, or "optimization menu," to graphically assist the user change camera setting before taking a photograph.

The keypad 16 (also referred to as a "user input device") may provide for a variety of user input operations. For example, the keypad 16 may include alphanumeric keys 20 for allowing entry of alphanumeric information such as telephone numbers, phone lists, contact information, notes, etc. In addition, the keypad 16 may include special function keys 21 such as a "call send" key for initiating or answering a call, and a "call end" key for ending or "hanging up" a call. Special function keys 21 may also include activation dedicated function keys for activation of the camera. In addition, the special function keys 21 may also include a key for setting the camera in an image detection mode (as discussed below). Special function keys 21 may also include menu navigation keys, for example, for navigating through a menu displayed on the display 14 to select different telephone functions, profiles, settings, etc., as is conventional. Other keys associated with the mobile telephone may include a volume key, an audio mute key, an on/off power key, a web browser launch key, a camera key, etc. Keys or key-like functionality may also be embodied as a touch screen associated with the display 14.

The mobile telephone 10 includes conventional call circuitry that enables the mobile telephone 10 to establish a call and/or exchange signals with a called/calling device, typically another mobile telephone or landline telephone. However, the called/calling device need not be another telephone, but may be some other device such as an Internet web server, content providing server, etc. The call circuitry also may be responsible for transmitting text messages that are prepared by the user.

With additional reference to FIG. 2, additional components of the mobile telephone 10 will be described. For the sake of brevity, generally conventional features of the mobile telephone 10 will not be described in great detail herein. The mobile telephone 10 includes a primary control circuit 24 that is configured to carry out overall control of the functions and operations of the mobile telephone 10, described herein. The control circuit 24 may include a processing device 26, such as a CPU, microcontroller or microprocessor. The processing device 26 executes code stored in a memory (not shown) within the control circuit 24 and/or in a separate memory, such as memory 18, in order to carry out operation of the mobile telephone 10. The memory 18 may be, for example, one or more of a buffer, a flash memory, a hard drive, a removable media, a volatile memory, a non-volatile memory or other suitable device. In addition, the processing device 26 executes code in order to perform a camera application 22.

It will be apparent to a person having ordinary skill in the art of computer programming, and specifically in applications programming for mobile telephones or other electronic devices, how to program a mobile telephone 10 to operate and carry out the functions described herein. Accordingly, details as to the specific programming code have been left out for the sake of brevity. Also, while the camera application 22 is executed by the processing device 26 in accordance with the preferred embodiment of the invention, such functionality could also be carried out via dedicated hardware, firmware, software, or combinations thereof, without departing from the scope of the invention. Likewise, the camera application 22 may be stored in memory or any other suitable device and executed by the processing device 26.

Figure 2:
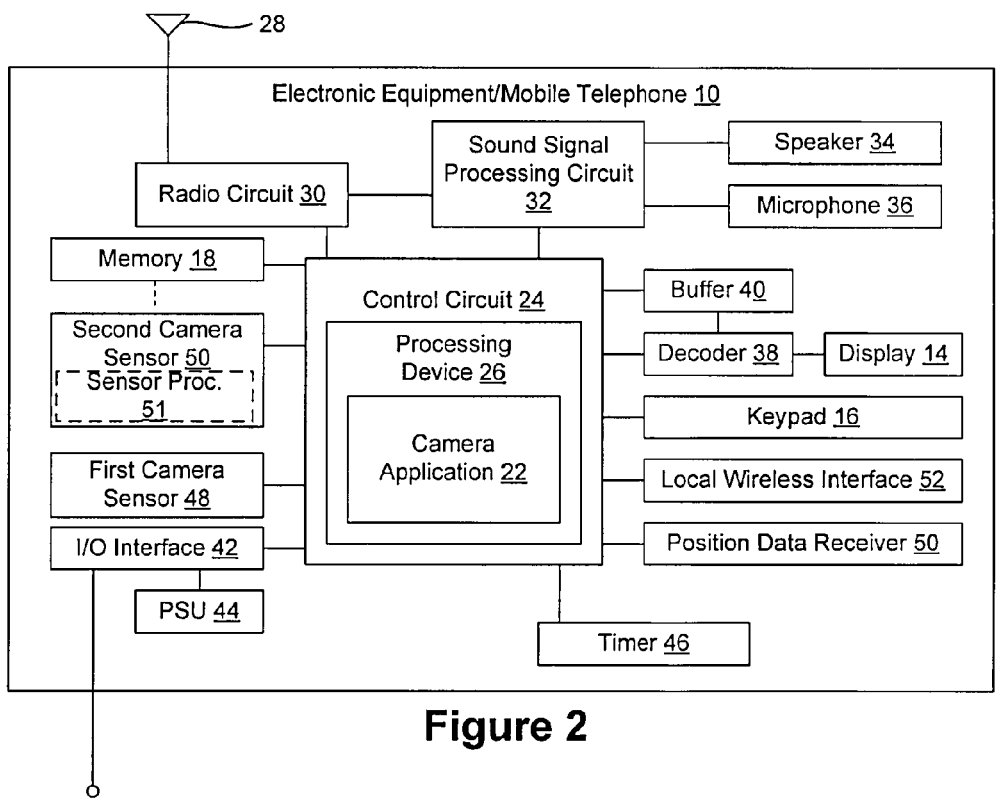
FIG. 2 is a schematic block diagram of the relevant portions of the mobile telephone of FIG. 1 in accordance with an embodiment of the present invention.

Continuing to refer to FIGS. 1A, 1B and 2, the mobile telephone 10 includes an antenna 28 coupled to a radio circuit 30. The radio circuit 30 includes a radio frequency transmitter and receiver for transmitting and receiving signals via the antenna 28 as is conventional. The radio circuit 30 may be configured to operate in a mobile communications system. The radio circuit 30 may be further configured to receive data and/or audiovisual content. For example, the receiver may be an IP datacast compatible receiver compatible with a hybrid network structure providing mobile communications and digital broadcast services, such as DVB-H mobile television and/or mobile radio. Other receivers for interaction with a mobile radio network or broadcasting network are possible and include, for example, GSM, CDMA, WCDMA, MBMS, WiFi, WiMax, DVB-H, ISDB-T, etc.

The mobile telephone 10 further includes a sound signal processing circuit 32 for processing audio signals transmitted by/received from the radio circuit 30. Coupled to the sound processing circuit 32 are a speaker 34 and a microphone 36 that enable a user to listen and speak via the mobile telephone 10 as is conventional. The radio circuit 30 and sound processing circuit 32 are each coupled to the control circuit 24 so as to carry out overall operation. Audio data may be passed from the control circuit 24 to the sound signal processing circuit 32 for playback to the user. The audio data may include, for example, audio data from an audio file stored by the memory 18 and retrieved by the control circuit 24. The sound processing circuit 32 may include any appropriate buffers, decoders, amplifiers and so forth.

The mobile telephone 10 also includes the aforementioned display 14 and keypad 16 coupled to the control circuit 24. The display 14 may be coupled to the control circuit 24 by a video decoder 38 that converts video data to a video signal used to drive the display 14. The video data may be generated by the control circuit 24, retrieved from a video file that is stored in the memory 18, derived from an incoming video data stream received by the radio circuit 30 or obtained by any other suitable method. Prior to being fed to the decoder 38, the video data may be buffered in a buffer 40.

The mobile telephone 10 further includes one or more I/O interface(s) 42. The I/O interface(s) 42 may be in the form of typical mobile telephone I/O interfaces and may include one or more electrical connectors. As is typical, the I/O interface(s) 42 may be used to couple the mobile telephone 10 to a battery charger to charge a battery of a power supply unit (PSU) 44 within the mobile telephone 10. In addition, or in the alternative, the I/O interface(s) 42 may serve to connect the mobile telephone 10 to a wired personal hands-free adaptor (not shown), such as a headset (sometimes referred to as an earset) to audibly output sound signals output by the sound processing circuit 32 to the user. Further, the I/O interface(s) 42 may serve to connect the mobile telephone 10 to a personal computer or other device via a data cable. The mobile telephone 10 may receive operating power via the I/O interface(s) 42 when connected to a vehicle power adapter or an electricity outlet power adapter.

The mobile telephone 10 may also include a timer 46 for carrying out timing functions. Such functions may include timing the durations of calls, generating the content of time and date stamps, automatically acquiring images at predetermined and/or user defined time intervals.

As indicated above, the mobile telephone 10 may include a first camera sensor 48 for taking digital pictures and/or movies. Image and/or video files corresponding to the pictures and/or movies may be stored in the memory 18 and/or any other suitable storage device. In some embodiments, the mobile telephone 10 may include a flash 49 for assisting the first camera sensor 48 take photographs in certain illumination conditions. As shown in FIG. 2, the first camera sensor 48 may be coupled to the control circuit 24. In general operation, a user utilizes a user input device (e.g., keypad 16) to activate the camera application 22. Upon activation of the camera application 22, the application 22 will load in memory 18 and/or a memory associated with the control circuit.

The mobile telephone 10 also includes a second camera sensor 50 for acquiring image data information. The second camera sensor 50 is generally active when the mobile telephone 10 is in an operating state. For example, when the mobile telephone is in an "on" state, the second camera sensor 50 is active. As shown in FIG. 2, the second camera sensor 50 may be coupled to the control circuit 24 and optionally to memory 18. In general operation, when the mobile telephone 10 is operation (e.g., in the "on" state), the second camera sensor 50 may acquire image data information. The image data information may be any information associated with the environment in which the mobile telephone 10 is located and/or a scene or image in which the second camera sensor 50 is directed. Exemplary image data information includes: color balance, white balance, gray balance, neutral balance, need for flash support, focus distance, lighting conditions, image stability control, etc. Any information that may be utilized by the camera application 22 may be acquired by the second camera sensor 50 and may be referred herein to as image data information.

The second camera sensor 50 may acquire the image data information at any desired time. For example, the second camera sensor 50 may periodically acquire image data information continuously and/or at a predetermined time interval (e.g., every 1 second, every 5 seconds, 30 seconds, 1 minute, etc.). The time interval may also be customized by the user. The selection of the interval is a design choice that should balance the need for updated image data information with battery consumption of the mobile telephone 10.

Once acquired by the second camera sensor 50, the image data information is stored in a suitable storage element (e.g., memory 18, buffer 40, control circuit 24, sensor processor 51, etc.). For example, the image data information may be stored in memory 18 and/or another internal memory device and/or a removable memory device. For example, the image data information may be continuously provided directly by the processor 51 of the second camera sensor, in which case, the processor may also be the storage element. In another embodiment, a buffer coupled to the processor may also be a storage element. In addition, the image data information may also be streamed from a port for use by camera application at the desired time, in which case, the port may also be a storage element.

More recently acquired image data information may be stored over older image data information. Alternatively, image data information acquired at a predetermined number of time points may be saved. One of ordinary skill in the art will readily appreciate that a variety of data storage techniques may be used in accordance with aspects of the present invention.

The first camera sensor 48 and the second camera sensor 50 may be any type of suitable sensor. For example, two types of sensors include charge-coupled device (CCD) and complementary metal-oxide-semiconductor (CMOS). The first camera sensor 48 and the second camera sensor 50 may be identical sensors (e.g., including sensor type and/or resolution). The first camera sensor 48 and the second camera sensor 50 may be the same sensor type, but may have different resolutions. For example, since the second camera sensor 50 is generally not used to take the actual photograph, the second camera sensor 50 may be a lower resolution sensor than the first camera sensor 48. The first camera sensor 48 and the second camera sensor 50 may also be different sensor types having identical resolution and/or different resolution.

The mobile telephone 10 also may include a position data receiver 52, such as a global positioning system (GPS) receiver, Galileo satellite system receiver or the like. The mobile telephone 10 also may include a local wireless interface 54, such as an infrared transceiver and/or an RF adaptor (e.g., a Bluetooth adapter), for establishing communication with an accessory, a hands-free adaptor (e.g., a headset that may audibly output sounds corresponding to audio data transferred from the mobile telephone 10 to the adapter), another mobile radio terminal, a computer or another device.

The mobile telephone 10 may be configured to transmit, receive and process data, such as text messages (e.g., colloquially referred to by some as "an SMS"), electronic mail messages, multimedia messages (e.g., colloquially referred to by some as "an MMS"), image files, video files, audio files, ring tones, streaming audio, streaming video, data feeds (including podcasts) and so forth. Processing such data may include storing the data in the memory 18, executing applications to allow user interaction with data, displaying video and/or image content associated with the data, outputting audio sounds associated with the data and so forth.

Figure 3:
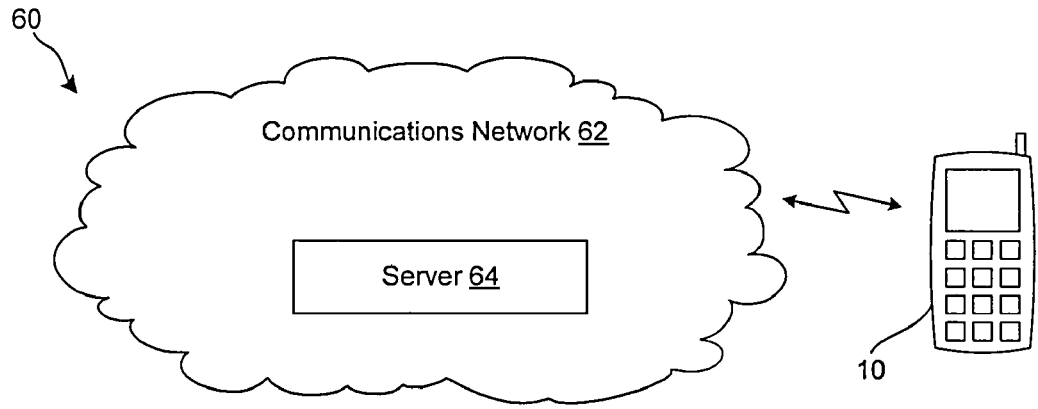
FIG. 3 is a schematic diagram of a communications system in which the mobile telephone of FIG. 1 may operate.

With additional reference to FIG. 3, the mobile telephone 10 may be configured to operate as part of a communications system 60. The system 60 may include a communications network 62 having a server 64 (or servers) for managing calls placed by and destined to the mobile telephone 10, transmitting data to the mobile telephone 10 and carrying out any other support functions. The server 64 generally communicates with the mobile telephone 10 via a transmission medium. The transmission medium may be any appropriate device or assembly, including, for example, a communications tower, another mobile telephone, a wireless access point, a satellite, etc. Portions of the network may include wireless transmission pathways. The network 62 may support the communications activity of multiple mobile telephones 10, although only one mobile telephone 10 is shown in the illustration of FIG. 3.

In one embodiment, the server 64 may operate in stand alone configuration relative to other servers of the network 62 or may be configured to carry out multiple communications network functions. As will be appreciated, the server 64 may be configured as a typical computer system used to carry out server functions and may include a processor configured to execute software containing logical instructions that embody the functions of the server 64.

Figure 4:
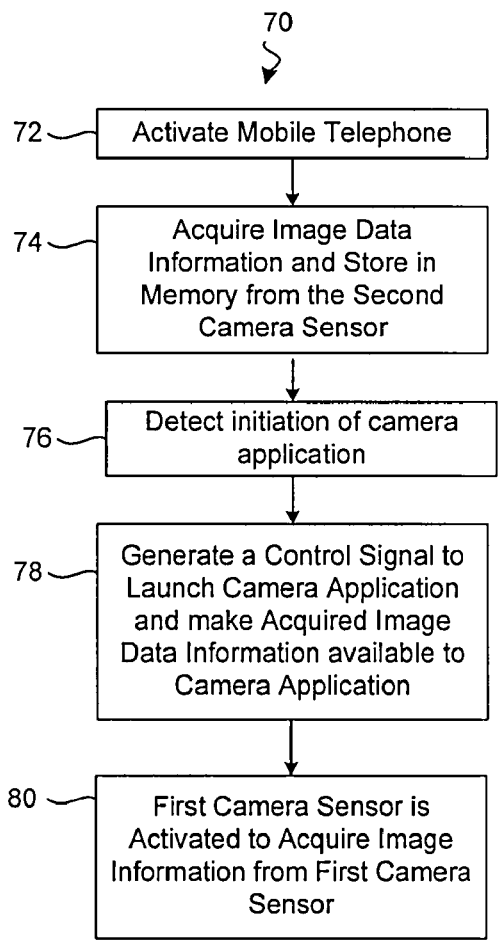
FIG. 4 is a flow chart of an exemplary camera function in accordance with the present invention.

With additional reference to FIG. 4, illustrated is a flow chart of an exemplary method 70 in accordance with aspects of the present invention. The flow chart may be thought of as depicting steps of a method. Although FIG. 4 shows a specific order of executing functional logic blocks, the order of execution of the blocks may be changed relative to the order shown. Also, two or more blocks shown in succession may be executed concurrently or with partial concurrence. Certain blocks also may be omitted. In addition, any number of commands, state variables, semaphores or messages may be added to the logical flow for purposes of enhanced utility, accounting, performance, measurement, troubleshooting, and the like. It is understood that all such variations are within the scope of the present invention.

The method may begin in block 72 by activating the mobile telephone 10. The mobile telephone 10 includes a first camera sensor for taking a digital photograph and a second camera sensor for acquiring image data information while the mobile telephone is in an operative state. Activating the mobile telephone 10 may be invoked by user action, such as by pressing a particular key of the keypad 16. Activating the mobile telephone 10 generally turns on the mobile telephone 10 and activates the second camera sensor 50.

At block 74, image data information is acquired from the second camera sensor 50 and is stored in a suitable memory. The memory may be primary memory (e.g., memory 18) and/or an internal memory associated with the control circuit 24 and/or a removable memory (not shown). As stated above, the image data information may be acquired at any desired time. For example, the second camera sensor 50 may periodically acquire image data information continuously and/or at a predetermined time interval (e.g., every 1 second, every 5 seconds, 30 seconds, 1 minute, etc.). The time interval may also be customized by the user. The selection of the interval is a design choice that should balance the need for updated image data information with battery consumption of the mobile telephone 10.

At block 76, initiation of the camera application is detected. The camera application may be initiated in any manner. One exemplary manner is for a user to invoke a user input device, such as by pressing a particular key of the keypad 16.

At block 78, a control signal is generated based on the user activating the camera application 22. The control signal causes the control circuit to load the camera application 22 for use. The acquired image data information is made available to the camera application at any desired time. For example, the image data information is made available to camera application to load the acquired image data information as the particular parameter is being loaded by the control circuit. In another embodiment, the image data information is made available to the camera application when the functional aspects of the camera application have been loaded.

At block 80, the first camera sensor is activated to acquire image information to take a desired photograph by the user. As is conventional, the display 14 may be used as an electronic viewfinder for the first camera sensor 48. As an electronic view finder, the display presents field of view associated with the camera sensor. Through the electronic view finder, the user may focus the digital camera, playback stored images, videos, etc. At the desired time, the user may take a photograph and the image may be stored in a conventional manner.

Figure 5:
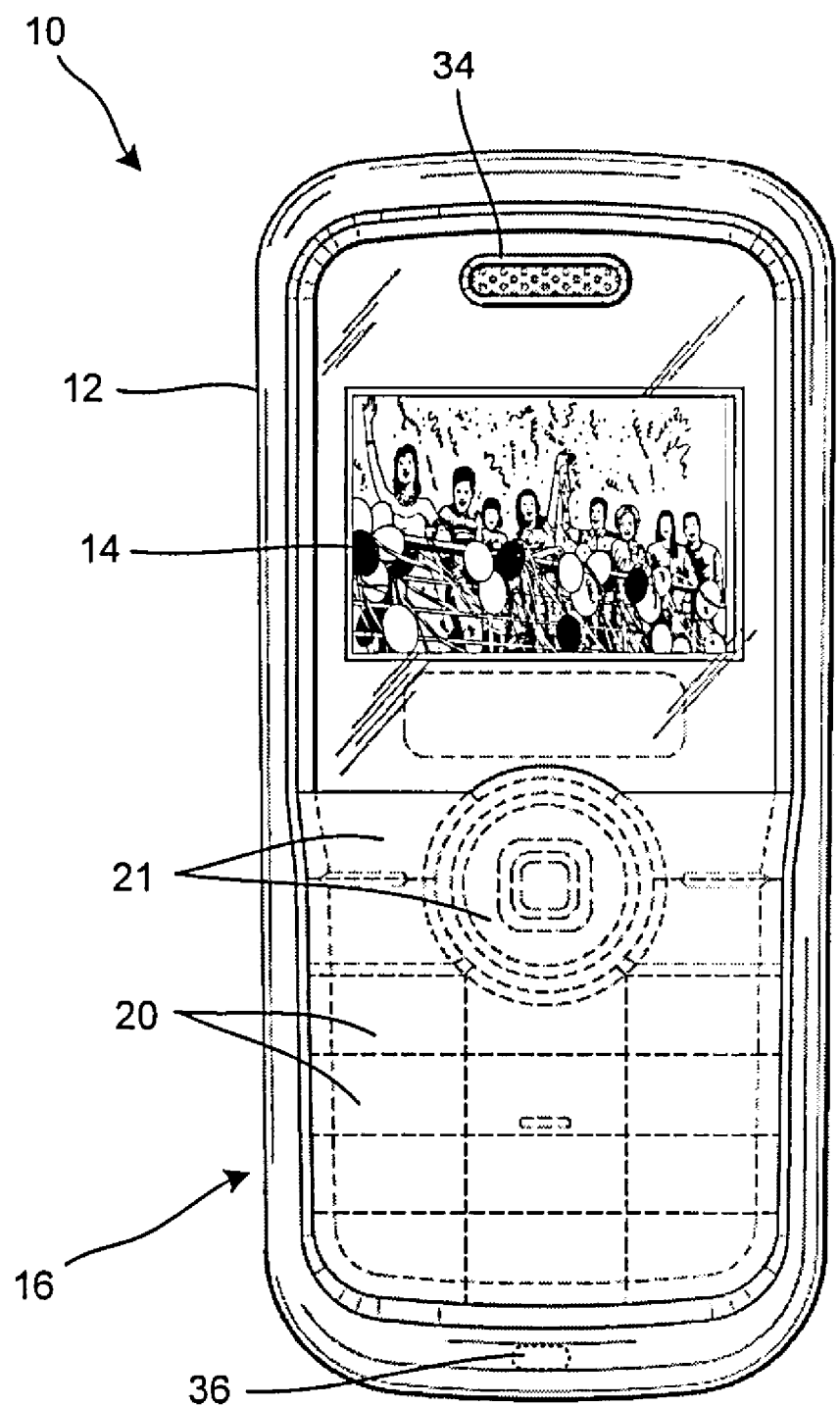
FIG. 5 is another exemplary representation of a mobile telephone as an exemplary electronic equipment when the mobile telephone is placed in a camera mode.

With additional reference to FIG. 5, shown is an exemplary mobile telephone 10 for which the first camera sensor 48 and second camera sensor 50 are functional and the display 14 is used as a viewfinder. During use as a viewfinder, the display 14 may show images detected by the first camera sensor 48 to provide the user with an indication of the field of view of the first camera sensor 48 and what may be contained in a picture if a photograph were to be taken at that moment in time. The display 14 may be refreshed so that the image displayed on the display is a current representation of the field of view of the first camera sensor 48. In the illustrated example, the display 14 shows an image of a group of people who are in the field of view of the first camera sensor 48. The first camera sensor 48 is not illustrated in FIG. 5 as, in this embodiment, a lens of the camera 48 is located on an opposite side of the mobile telephone 10 from the display 14.

Preferably the second camera sensor 50 is positioned near the first camera sensor 50, as shown in FIG. 1B. Positioning the two sensors close together allows for a smooth transaction between the startup value provided to the camera application by the second camera sensor 48 and actual camera data acquired by the first camera sensor 48 during the process of focusing and/or taking a photograph.

Computer program elements of the invention may be embodied in hardware and/or in software (including firmware, resident software, micro-code, etc.). The invention may take the form of a computer program product, which can be embodied by a computer-usable or computer-readable storage medium having computer-usable or computer-readable program instructions, "code" or a "computer program" embodied in the medium for use by or in connection with the instruction execution system. In the context of this document, a computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium such as the Internet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner. The computer program product and any software and hardware described herein form the various means for carrying out the functions of the invention in the example embodiments.

Specific embodiments of an invention are disclosed herein. One of ordinary skill in the art will readily recognize that the invention may have other applications in other environments. In fact, many embodiments and implementations are possible. The following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". It should also be noted that although the specification lists method steps occurring in a particular order, these steps may be executed in any order, or at the same time.

What is claimed is:

1. A mobile radio terminal, comprising:
   a radio circuit for establishing communication with a communication network;
   a first camera sensor for taking digital photographs;
   a second camera sensor for acquiring image data information, wherein the second camera sensor stores the acquired image data information in a storage element; and
   a control circuit coupled to the radio circuit, the first camera sensor, the second camera sensor and the storage element, wherein the control circuit is configured to execute logic to:
      store image data information acquired from the second camera sensor in the storage element;
      detect initiation of a camera application by an associated user;
      generate a control signal to launch the camera application, wherein at least a portion of the acquired image data information is provided to the camera application as one or more parameters upon launching of the camera application; and
      acquiring image information from the first camera sensor for taking a photograph.

2. The mobile radio terminal of claim 1, wherein the first camera sensor is at least one sensor selected from a group consisting of: a charge-coupled device (CCD) or a complimentary metal-oxide semiconductor (CMOS).

3. The mobile radio terminal of claim 1, wherein the second camera sensor is at least one sensor selected from a group consisting of a charge-coupled device (CCD) or a complimentary metal-oxide semiconductor (CMOS).

4. The mobile radio terminal of claim 1, wherein the first camera sensor has greater resolution than the second camera sensor.

5. The mobile radio terminal of claim 1, wherein the image data information is periodically acquired at a predetermined time interval by the second camera sensor.

6. The mobile radio terminal of claim 5, wherein the image data information includes at least one selected from a group consisting of: color balance, focal distance and/or flash support.

7. The mobile radio terminal of claim 1, wherein the image data information is continuously updated while the mobile radio terminal is in an operative state.

8. The mobile radio terminal of claim 7, wherein updated image data information is stored over image data information previously stored in the storage element.

9. The mobile radio terminal of claim 1, wherein the communication network is a mobile telephone communication network.

10. A method for executing a camera application in a mobile radio terminal, the method comprising:
providing a mobile radio terminal having a first camera sensor for taking digital photographs and a second camera sensor for acquiring image data information while the mobile radio terminal is in an operative state;
storing image data information acquired from the second camera sensor in a storage element;
detecting initiation of a camera application by an associated user;
generating a control signal to launch the camera application, wherein at least a portion of the acquired image data information is provided to the camera application as one or more parameters upon launching of the camera application; and
acquiring image information from the first camera sensor for taking a photograph.

11. The method of claim 10, wherein the control circuit detects an associated user depressing a user input device coupled to the control circuit prior to generation of the control signal.

12. The method of claim 10, wherein the first camera sensor is at least one sensor selected from a group consisting of: a charge-coupled device (CCD) or a complimentary metal-oxide semiconductor (CMOS).

13. The method of claim 12, wherein the second camera sensor is at least one sensor selected from a group consisting of a charge-coupled device (CCD) or a complimentary metal-oxide semiconductor (CMOS).

14. The method of claim 12, wherein the image data information is periodically updated at a predetermined time interval.

15. The method of claim 14, wherein updated image data information is stored over image data information previously stored in the storage element.

16. An electronic equipment comprising:
a first camera sensor for taking digital photographs;
a second camera sensor for acquiring image data information while the electronic equipment is in an operative state;
a storage element coupled to the second camera sensor, wherein the storage element stores the acquired image data information; and
a control circuit configured to execute a logic to:
periodically acquire image data information from the second camera sensor;
store the acquired image data information in the storage element;
detecting initiation of a camera application by a user, wherein the camera application includes one or more image parameters; and
setting at least one of the one or more image parameters associated with the camera application to the acquired image data information.

17. The electronic equipment of claim 16 further including setting at least one of the one or image parameters associated with the camera application to a value acquired by the first camera sensor.

18. The electronic equipment of claim 16, further including a radio circuit coupled to the control circuit for communication with a mobile communications network.

19. The electronic equipment of claim 18, wherein the electronic equipment is a mobile telephone.

* * * * *